US012695726B2

(12) United States Patent
Dornal et al.

(10) Patent No.: US 12,695,726 B2
(45) Date of Patent: Jul. 28, 2026

(54) SYSTEM AND METHOD FOR TESTING A VIRTUAL PRIVATE NETWORK SERVER

(71) Applicant: Alkira, Inc., San Jose, CA (US)

(72) Inventors: Santosh Kumar Dornal, San Ramon, CA (US); Sudarvannan Sivakumar, Milpitas, CA (US); Sanchit Lodha, San Jose, CA (US); Veera Raghavendra Prasad Ravinutala, San Ramos, CA (US); Bharath Chakravarthy, San Ramon, CA (US)

(73) Assignee: Alkira, Inc., San Jose, CA (US)

( * ) Notice: Subject to any disclaimer, the term of this patent is extended or adjusted under 35 U.S.C. 154(b) by 0 days.

(21) Appl. No.: 18/809,369

(22) Filed: Aug. 20, 2024

(65) Prior Publication Data

US 2025/0071096 A1     Feb. 27, 2025

Related U.S. Application Data

(60) Provisional application No. 63/578,969, filed on Aug. 25, 2023.

(51) Int. Cl.
H04L 9/40          (2022.01)
H04L 43/50         (2022.01)

(52) U.S. Cl.
CPC .......... H04L 63/0272 (2013.01); H04L 43/50 (2013.01)

(58) Field of Classification Search
CPC . H04L 63/0272; H04L 43/50; H04L 12/4641; H04L 63/0876
See application file for complete search history.

(56) References Cited

U.S. PATENT DOCUMENTS

| | | | | |
|---|---|---|---|---|
| 5,878,032 A | * | 3/1999 | Mirek | H04Q 11/0478 370/252 |
| 6,601,020 B1 | * | 7/2003 | Myers | G06F 11/3414 714/E11.193 |
| 8,156,199 B1 | * | 4/2012 | Hoche-Mong | H04L 63/0272 709/224 |
| 10,721,097 B2 | * | 7/2020 | Nandoori | H04L 47/125 |
| 11,089,076 B1 | * | 8/2021 | Thario | H04L 65/612 |
| 11,190,491 B1 | * | 11/2021 | Kaciulis | H04L 63/029 |
| 11,245,670 B1 | * | 2/2022 | Celiesius | H04L 63/0876 |
| 11,310,146 B1 | * | 4/2022 | Kaciulis | H04L 63/0428 |
| 11,418,599 B1 | * | 8/2022 | Lažauskas | H04L 67/51 |
| 11,582,197 B1 | * | 2/2023 | Pabijanskas | H04L 12/4641 |

(Continued)

*Primary Examiner* — David Garcia Cervetti
(74) *Attorney, Agent, or Firm* — Vani Moodley, Esq.

(57) ABSTRACT

Provided are a system and a method for testing virtual private network server. The system is configured to receive a request for a VPN server, the request indicating a number of test operations associated with the VPN server and a computation resource requirement for performing the test operations. Further configure a master node and a set of worker nodes based on the computation resource requirement and cause the set of worker nodes to perform the test operations to generate traffic data. Further, validate a load of the VPN server based on the generated traffic data and resources of the VPN server. Further, to validate the load of the VPN server, identify a time taken by the VPN server to process the traffic data. Further, on determining the time to be greater than a threshold, cause to identify that VPN server is unable to process the load of the traffic data.

12 Claims, 8 Drawing Sheets

600

(56) References Cited

U.S. PATENT DOCUMENTS

| | | | | |
|---|---|---|---|---|
| 11,777,905 B1* | 10/2023 | Pabijanskas | | H04L 41/0806 |
| | | | | 726/15 |
| 11,831,615 B1* | 11/2023 | Funka | | H04L 63/0272 |
| 11,929,990 B1* | 3/2024 | Januskevicius | | H04L 63/0272 |
| 12,063,160 B1* | 8/2024 | Raghunandan | | H04L 45/22 |
| 2004/0015738 A1* | 1/2004 | Chang | | G06F 11/221 |
| | | | | 714/30 |
| 2007/0025261 A1* | 2/2007 | Ginsberg | | H04L 43/50 |
| | | | | 370/250 |
| 2007/0113275 A1* | 5/2007 | Khanna | | H04L 67/1038 |
| | | | | 713/151 |
| 2007/0140135 A1* | 6/2007 | Sheppard | | H04L 41/5032 |
| | | | | 370/241 |
| 2011/0069634 A1* | 3/2011 | Hajiaghayi | | H04L 45/123 |
| | | | | 370/254 |
| 2013/0081132 A1* | 3/2013 | Lee | | H04L 63/0272 |
| | | | | 726/15 |
| 2013/0182712 A1* | 7/2013 | Aguayo | | H04L 12/4675 |
| | | | | 370/395.53 |
| 2015/0363232 A1* | 12/2015 | Li | | G06F 11/3072 |
| | | | | 718/104 |
| 2016/0028598 A1* | 1/2016 | Khakpour | | H04L 43/50 |
| | | | | 709/224 |
| 2018/0176117 A1* | 6/2018 | Gudetee | | H04L 41/145 |
| 2019/0109777 A1* | 4/2019 | Mircescu | | H04L 67/104 |
| 2020/0245160 A1* | 7/2020 | Chu | | H04W 48/18 |
| 2021/0109734 A1* | 4/2021 | Vittal | | G06F 11/1433 |
| 2021/0243209 A1* | 8/2021 | Ramani | | H04L 63/20 |
| 2022/0027431 A1* | 1/2022 | Zheng | | G06F 16/986 |
| 2022/0029965 A1* | 1/2022 | Chanak | | H04L 63/029 |
| 2022/0086215 A1* | 3/2022 | Rowe | | H04L 43/0864 |
| 2022/0210130 A1* | 6/2022 | Kaciulis | | H04L 69/14 |
| 2022/0224620 A1* | 7/2022 | Chhabra | | H04L 12/4633 |
| 2022/0224621 A1* | 7/2022 | Devarajan | | H04L 43/103 |
| 2022/0224703 A1* | 7/2022 | Devarajan | | H04L 45/20 |
| 2022/0337480 A1* | 10/2022 | Vanajakshi | | H04L 63/0272 |
| 2022/0368631 A1* | 11/2022 | Narula | | H04L 45/02 |
| 2023/0034229 A1* | 2/2023 | Oliveira | | H04L 43/045 |
| 2023/0124886 A1* | 4/2023 | Viswambharan | | H04L 12/66 |
| | | | | 370/254 |
| 2023/0259446 A1* | 8/2023 | Sharma | | G06F 11/3414 |
| | | | | 702/182 |
| 2023/0283537 A1* | 9/2023 | Balaiah | | H04L 47/12 |
| | | | | 370/254 |
| 2023/0291663 A1* | 9/2023 | Warmenhoven | | H04L 63/0236 |
| 2024/0098068 A1* | 3/2024 | Pabijanskas | | H04L 12/4633 |
| 2024/0103993 A1* | 3/2024 | Garg | | G06F 11/3419 |
| 2024/0396876 A1* | 11/2024 | Murauskas | | H04L 63/0272 |
| 2024/0430189 A1* | 12/2024 | Filsfils | | H04L 43/0829 |
| 2025/0202868 A1* | 6/2025 | Mineikis | | H04L 43/0864 |
| 2026/0002989 A1* | 1/2026 | Cruz | | G01R 31/31719 |

* cited by examiner

VPC 104-1

Kubernetes Pods 108

Orchestrator Pod 116-1

Orchestrator Pod 116-2

• • •

Orchestrator Pod 116-n

Data Plane 106

Vnet-facing 110

Service Point 112

Branch-facing 114

VPC 104-2

• • •

VPC 104-n

Master Kubernetes Cluster 102

100

700

702 CAUSE VIRTUAL PRIVATE NETWORK (VPN) SERVER TO RECEIVE AND PROCESS TRAFFIC DATA

704 IDENTIFY TIME TAKEN BY VPN SERVER

706 PERFORM COMPARISON BETWEEN THRESHHOLD AND TIME TAKEN

SYSTEM AND METHOD FOR TESTING A VIRTUAL PRIVATE NETWORK SERVER

TECHNOLOGICAL FIELD

The present invention generally relates to network testing, and more specifically, to providing testing availability of a virtual private network (VPN) server.

BACKGROUND

Virtual private network (VPN) servers may enable VPN connection and services to remote and/or local VPN clients by hosting multiple instances of virtual machines. The VPN server is configured to handle limited traffic based on a number of VPN clients. Increase in the number of VPN clients may cause increase in load on the virtual private network server. The load may lead to latency by introducing extra time for requests and responses.

BRIEF SUMMARY OF EXAMPLE EMBODIMENTS

Virtual private network server is used to a secure data transfer service that allows users to transfer and access the data through a secure connection. Virtual private network servers encrypt internet communication and keep user activity anonymous. The data centers connected to the VPN serve may generate the traffic on the VPN server. This generated traffic may lead to produce the load on the VPN server. The load may increase latency on the VPN server by introducing extra travel time for requests and responses. For example, there will be larger delay between the user request and the server response.

In one example, the load on the virtual private network sever may be generated due to the more clients connected to the server. Each client connection may require processing power and network resources. The more clients connected to the VPN sever, the higher the load on server.

In another example, the amount of data being transferred over the virtual private network server may also impact the load. Higher data transfer rate require more processing power and network bandwidth.

When the virtual private network server experiences a heavy load, several issues may arise, such as slow connection speed, connection terminated increased latency, reduced security, server crashes and the like. For example, a company that uses the virtual private network server to allow employees to securely access the company resources from remote locations. The company may experience a sudden increase in remote work due to a natural disaster or other event, the VPN server may become overloaded due to the increased demand. This may cause the virtual private network server to become unresponsive or to shut down completely, resulting in extended downtime and potentially lost data.

In order to solve the foregoing problem, the present disclosure may provide a system and method for testing virtual private network server to ensure the efficient working of the virtual private network server. The system disclosed in the present disclosure is configured to identify any inability to perform the server operations in real time and further correct any flaws in the working of the virtual private network server to ensure the effective running of the server. The system disclosed in the present disclosure ensures that operations being performed on the server do not terminate or end due to any flaws on the virtual private network server.

To this end, the system and method for testing virtual private network server validates the virtual private network server to check if the server is able to process the current data or current operations. In this manner, the present disclosure is able to track any flaws relating to for example, processing power, network bandwidth, client limit, operations and/or appearance, of the virtual private network server in real-time.

A system and a method are provided herein for testing virtual private network server to provide real-time, accurate and reliable validation of the virtual private network server.

In one aspect, a system for testing a virtual private network server is disclosed. The system comprises a processor, a memory coupled to the processor, the memory having stored therein at least one of programs or instructions executable by the processor to configure the system to receive a request for a VPN server, the request indicating a number of test operations associated with the VPN server and a computation resource requirement for performing the test operations. The processor is further configured to configure a master node and a set of worker nodes based on the computation resource requirement. Further, cause the set of worker nodes to perform the test operations to generate traffic data. Further, validate a load of the VPN server based on the generated traffic data and resources of the VPN server.

In additional system embodiments, the processor is further configured to receive the traffic data. Further, process the traffic data to generate routing messages corresponding to the traffic data.

In additional system embodiments, the VPN server is configured within a cloud exchange point.

In additional system embodiments, the processor is further configured to identify a time taken by the VPN server to process the traffic data. Further, on determining the time to be greater than a threshold, cause to identify that VPN server is unable to process the load of the traffic data.

BRIEF DESCRIPTION OF THE DRAWINGS

Figure 1:
Figure 2:
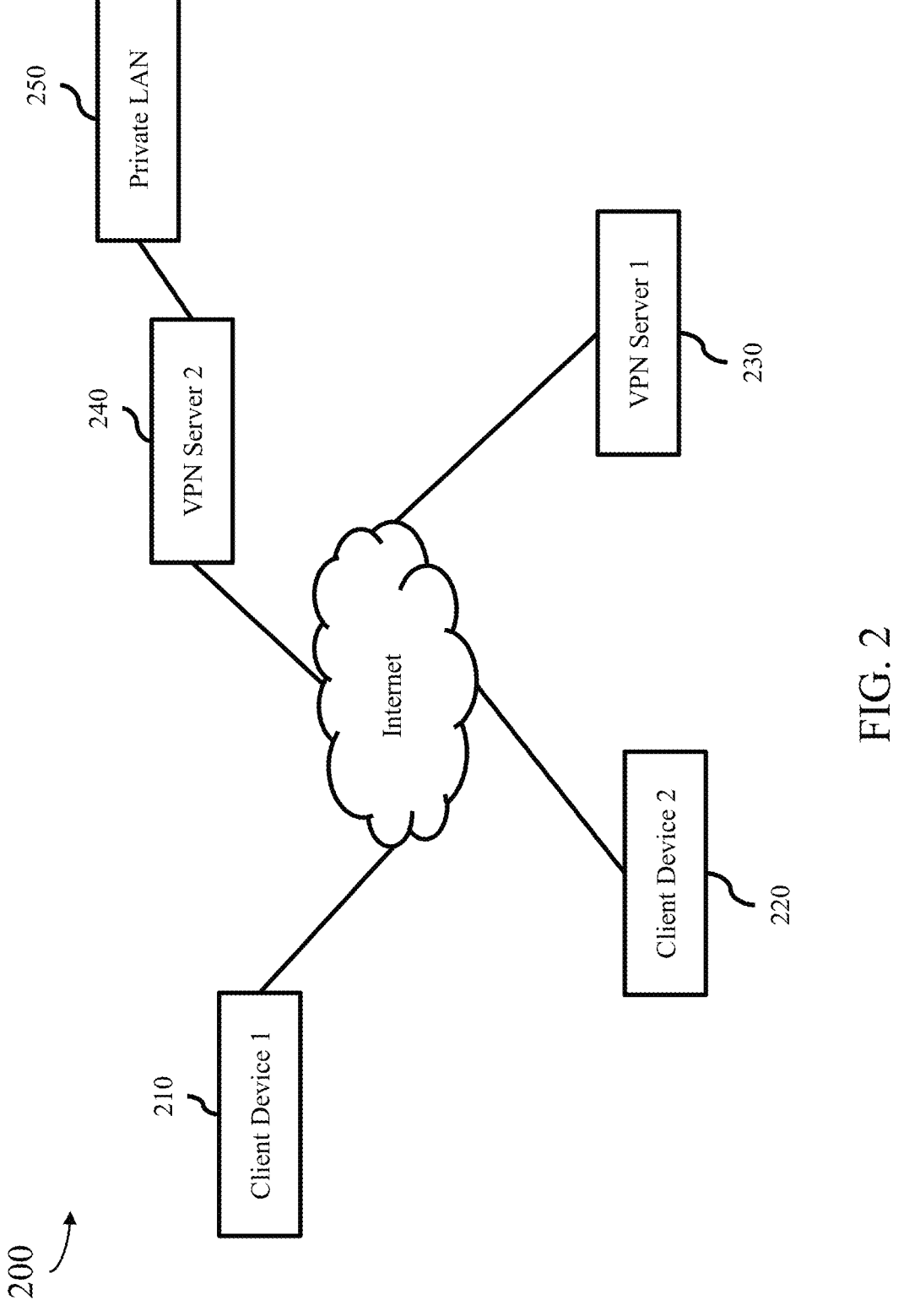
Figure 3:
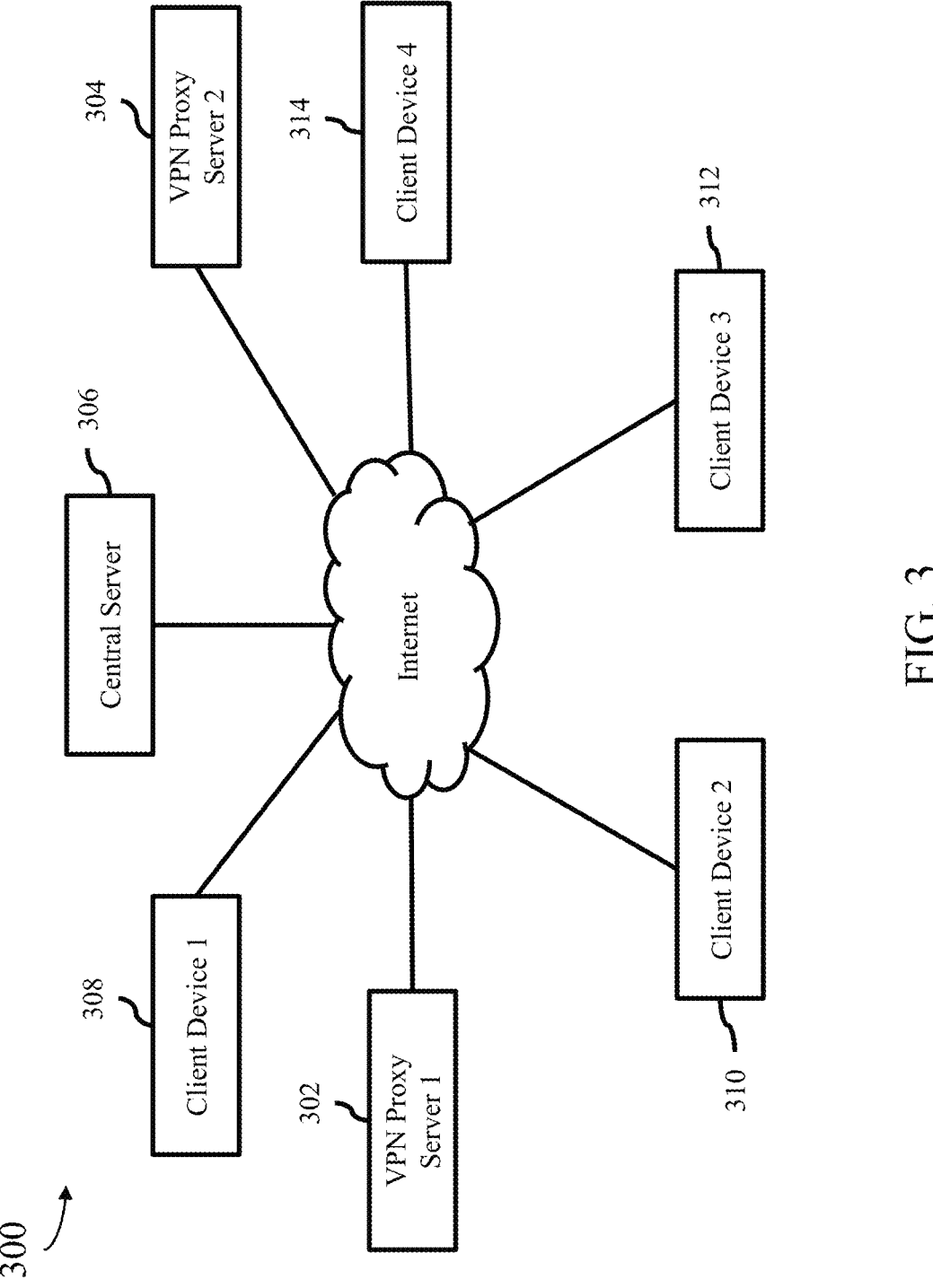
Figure 4:
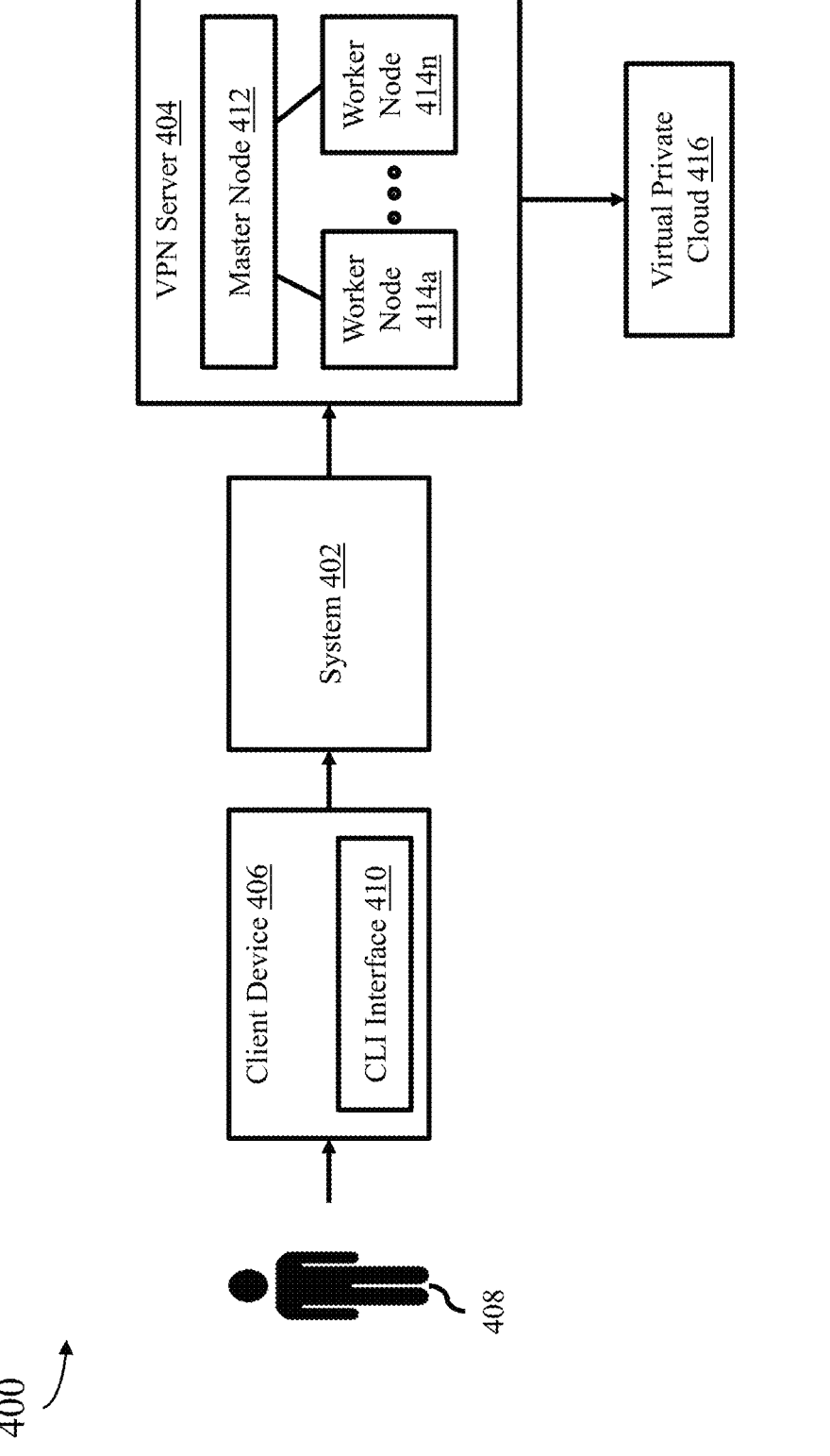
Figure 5:
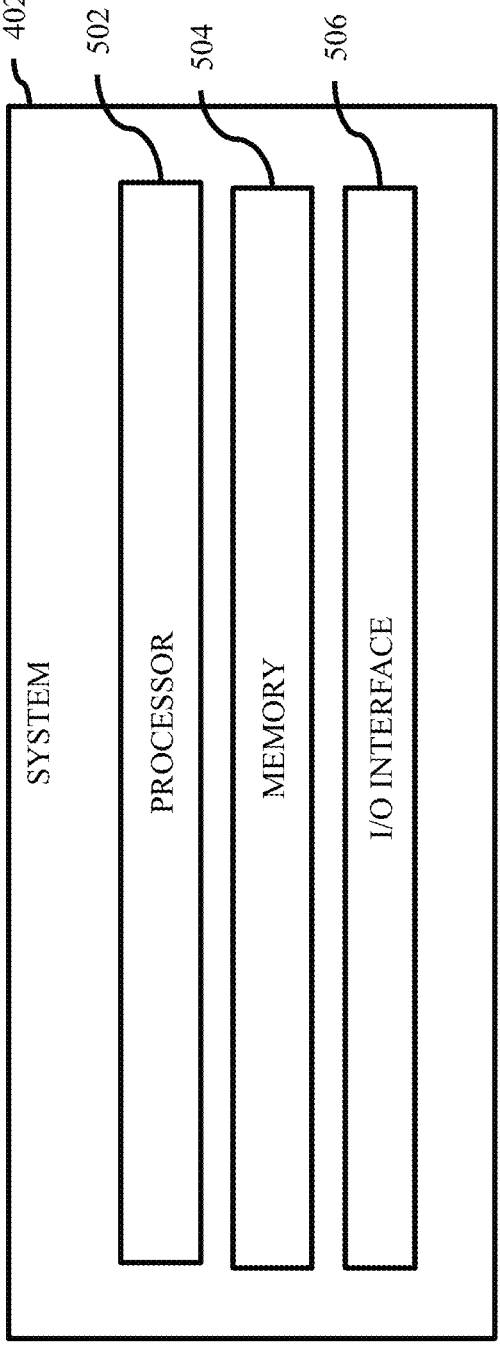
Figure 6:
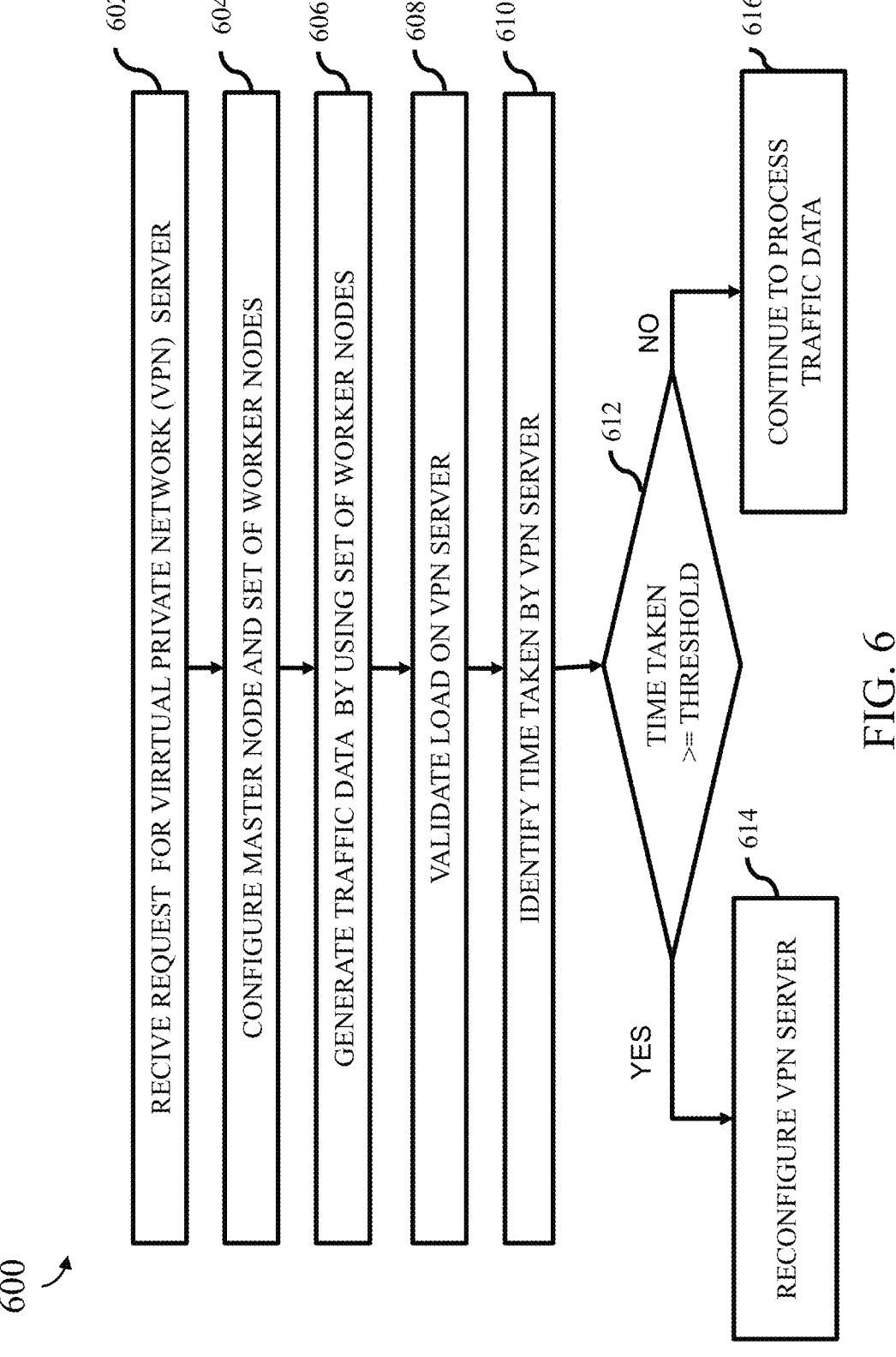
Figure 7:
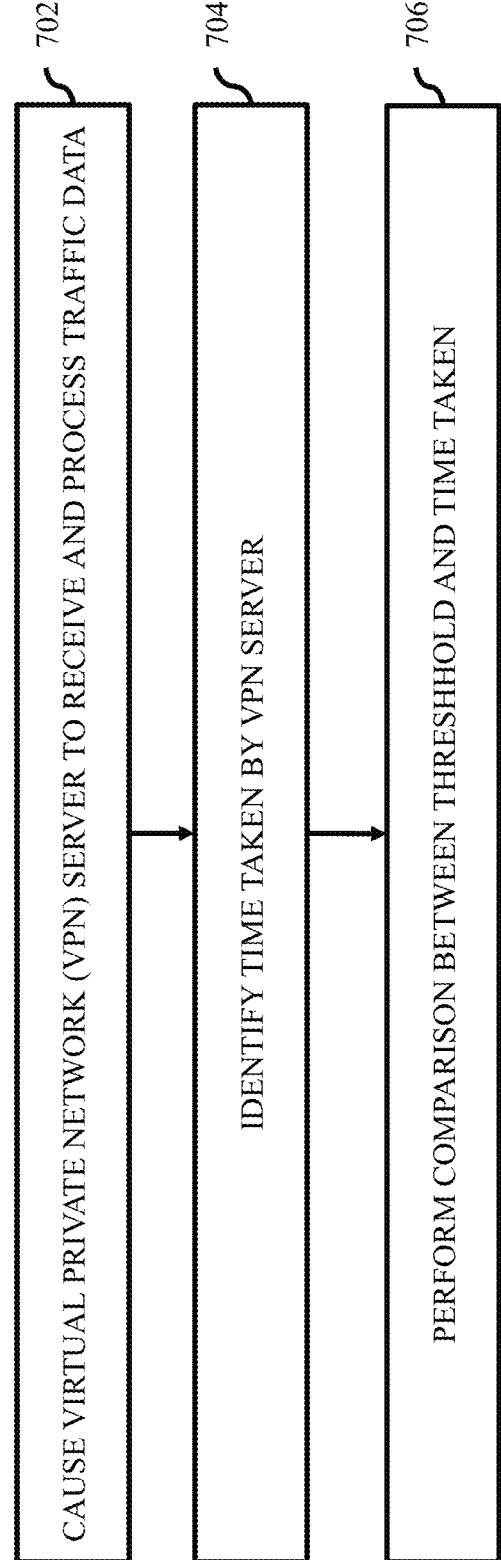
Figure 8:
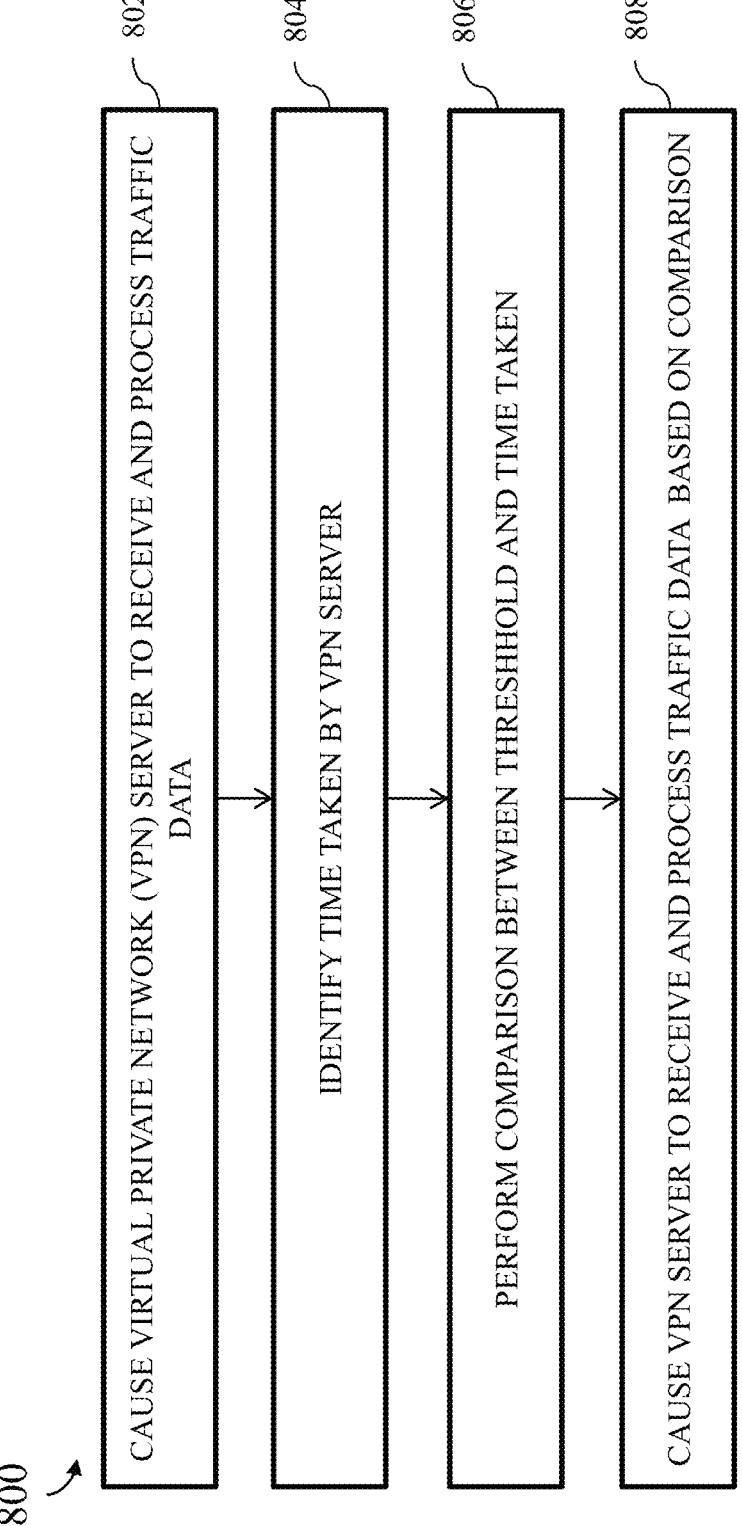

Having thus described example embodiments of the disclosure in general terms, reference will now be made to the accompanying drawings, which are not necessarily drawn to scale, and wherein:

FIG. 1 is a diagram of an example system of VPCs with a master Kubernetes cluster, in accordance with an example embodiment of the present disclosure;

FIG. 2 is a diagram illustrating a traditional network architecture of a VPN, in accordance with an example embodiment of the present disclosure;

FIG. 3 is a diagram illustrating a central server managing pooled resources of VPN proxy servers, in accordance with an example embodiment of the present disclosure;

FIG. 4 shows a network environment in which a system for testing a VPN server is implemented, in accordance with an example embodiment of the present disclosure;

FIG. 5 shows a block diagram of a system for testing the VPN server, in accordance with an example embodiment of the present disclosure;

FIG. 6 illustrates an example flowchart of a method for testing the VPN server, in accordance with an example embodiment of the present disclosure;

FIG. 7 illustrates an example flowchart of a method for performing a comparison between a threshold and time taken, in accordance with an example embodiment of the present disclosure; and FIG. 8 illustrates an example flowchart of a method for testing the VPN server, according to an embodiment of the present disclosure.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, systems and methods are shown in block diagram form only in order to avoid obscuring the present disclosure.

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. Also, reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced item. Moreover, various features are described which may be exhibited by some embodiments and not by others. Similarly, various requirements are described which may be requirements for some embodiments but not for other embodiments. As used herein, the terms "data," "content," "information," and similar terms may be used interchangeably to refer to data capable of being displayed, transmitted, received and/or stored in accordance with embodiments of the present disclosure. Thus, use of any such terms should not be taken to limit the spirit and scope of embodiments of the present disclosure.

As defined herein, a "computer-readable storage medium," which refers to a non-transitory physical storage medium (for example, volatile or non-volatile memory device), may be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

FIG. 1 is a diagram 100 of an example of a system of VPCs with a master Kubernetes cluster, according to an example embodiment. The diagram 100 includes a master Kubernetes cluster 102 and a VPC 104-1 to a VPC 104-*n* (collectively the VPCs 104). The VPC 104-1 includes a data plane 106 and Kubernetes pods 108. The data plane 106 includes a V-net facing datastore 110, a service point datastore 112, and a branch-facing datastore 114, which correspond to data associated with a V-node, S-node, and B-node respectively. The Kubernetes pods 108 include an orchestrator pod 116-1 to an orchestrator pod 116-*n* (collectively the orchestrator pods 116). The orchestrator pods 116, potentially including engines from the master Kubernetes cluster 102, are components of an orchestration engine, such as an external orchestration engine. The VPCs 104-2 to 104-*n* have a data plane and Kubernetes pods, as well (not shown).

In an example, the VPCs 104 may provide a secure, isolated and private cloud hosted within a public cloud. VPC clients may be able to run code, store data, host websites, and do anything else they could do in an ordinary private cloud, but the private cloud is hosted remotely by a public cloud provider. For example, the VPC allows virtually creating a private and isolated network such as a VPN, in the cloud.

In particular, the VPC isolates computing resources from the other computing resources available in the public cloud. The VPC may have a dedicated subnet and VLAN that are only accessible by the VPC client. This prevents anyone else within the public cloud from accessing computing resources within the VPC, thereby effectively reserving access to the VPC for the VPC client. The VPC client may connect to their VPC, for example, via VPN so that data passing into and out of the VPC is not visible to other public cloud users.

FIG. 2 is a diagram illustrating a traditional network architecture of a VPN network, according to an example embodiment.

A virtual private network (VPN) is a private network that interconnects remote networks through primarily public communication infrastructure such as the Internet. VPNs provide security through tunneling protocols and security procedures such as encryption. For example, a VPN may be used to securely connect branch offices of an organization to a head office network through the public Internet. A VPN can also be used to interconnect two similar-type networks over a dissimilar middle network. For example, two IPv6 networks can be connected over an IPv4 network using a VPN.

In a VPN, data transmitted from a client is routed through a VPN server which adds an authentication header for routing and authentication. The data is then encrypted and enclosed with an Encapsulating Security Payload. The Encapsulating Security Payload contains decryption and handling instructions. A receiving VPN server removes header information, decrypts data, and routes the data to its intended destination.

With such an additional level of security, an intruder has to not only intercept a packet, but decrypt the packet as well. Intruders who employ a man-in-the-middle attack between a server and a client must also have access to at least one private key for authenticating sessions. As VPN employs several layers of authentication and encryption, VPN connections provide a secure and effective means of connecting to the Internet.

As shown, the VPN network 200 comprises client devices 210 and 220, and VPN servers 230 and 240 are connected over a wide area network (WAN). The WAN may be, for example, the Internet. The VPN servers 230 or 240 may provide VPN service for client devices 210 and 220. VPN server 230 may also provide connectivity for client devices 210 and 220 to a private local area network (LAN) 250. For example, private LAN 250 may be a corporate network for which access is secured.

VPN works over any type of internet connection-Wi-Fi, cellular or wired. For example, the client devices 210 and 220 may connect to the VPN servers 230 or 240 through Wi-Fi_33 or cellular connection. The client devices 210 and 220 may connect to the VPN servers 230 or 240 through a wired connection (e.g., Ethernet, DSL, FiOS, etc.).

The client devices 210 and 220 may connect directly to the Internet without going through VPN servers 230 or 240, or connect to the Internet by establishing a connection through VPN Servers 230 or 240 which allows the client devices 210 and 220 to securely and anonymously access the Internet and download any content from the Internet. The client devices 210 and 220 may also access the private LAN 250 by connecting through the VPN server 240, as the private LAN 250 is connected to the VPN server 240.

However, there are various problems associated with using VPN servers, especially when one is trying to install and configure a VPN server. For example, a user may encounter technical issues during installation and configuration of VPN servers. Costs associated with purchasing and maintaining VPN servers is relatively high as well. In certain cases, the VPN servers 230 or 240 may be over burdened and may fail to provide the VPN services reliably. This may cause latency in communication of traffic over the Internet via the VPN server, and may further hamper user experience.

FIG. 3 is a diagram illustrating a central server 306 managing pooled resources of VPN proxy servers, according to an embodiment.

FIG. 3 shows devices 302 and 304 that are registered with the central server 306 as VPN proxy servers 302 and 304. Devices (for example, 302 and 304) register as VPN proxy servers to permit other devices (for example, client devices 308, 310, 312, and 314) to use them as VPN proxy servers to access content securely and privately on the Internet.

During registration with the central server 306, the VPN proxy servers 302 and 304 may provide information that may be used by the central server 306 for storing in its database. For example, the information provided by the VPN proxy servers 302 and 304 during their registration process with the central server 306 may include their respective geographic location (country, state/province, city, etc.) at registration time. The information may also include a type or bandwidth of their connection to the Internet. For example, this may be a connection type (for example, DSL, FiOS, cable, cellular or Wi-Fi, etc.) or speed of the Internet connection (for example, 10 Mbps, 25 Mbps or 50 Mbps, etc.). Additionally, the VPN proxy servers 302 and 304 may identify their platform type during registration (for example, desktop, laptop, touch pad or mobile phone, etc.).

For example, the database of the central server 306 may contain information on the registered VPN proxy servers 302 and 304 such as proxy server name, location, and bandwidth Info. For example:

The central server 306 stores information provided by the VPN proxy servers 302 and 304 during their registration process in its database located on the central server 306. The database may be any database with store and search capabilities which are familiar to a person skilled in the relevant art. For example, the database used may be an Oracle or SQL database.

One or more central servers may be configured as the central server 306. Optional features such as redundancy (hot standby or cold standby) or load sharing may be implemented to improve performance or reliability of the central server 306. The central server 306 may be a distributed system and may be a multi-master system that enables synchronization of data across the distributed system to improve data consistency. For example, when customer's information changes in one master central server, the data may be replicated on other master central servers to improve consistency of data across the various central servers. Additionally, the central server 306 may be identified based on the geographic location of the central server 306. Users of the client devices 308, 310, 312 and 314 may want to securely and anonymously (or privately) browse the Internet using VPN service. If client devices do not have access to their own private VPN, client devices may communicate with the central server 306 for VPN service through one of the registered VPN proxy servers 302 and 304.

In an embodiment, the central server 306 may manage VPN proxy alliances and may provide an authentication mechanism for customers, manage user profiles, and provide a list of optimized VPN proxy servers 302 and 304 to users.

In an example, the client device 302 may download software from the central server 306 and installs the software locally on the device. The software downloaded and installed includes a list of registered VPN proxy servers. The software installed may automate the connection process (reducing a number of manual steps required by VPN users to complete the connection process), and provide VPN connection to the Internet. Once central server 306 sends the list of registered VPN proxy servers to the client device 302, the client device 302 selects the most appropriate proxy server based on the preferences of the client. In an embodiment, the software installed on the client device 308 may detect VPN proxy servers and identify optimal VPN proxy servers for use. Such a list of registered VPN proxy servers may be received from any central server or trusted VPN proxy alliance member.

For example, when a user requests a VPN connection to the Internet, software installed on the client device 308 accesses the list of registered VPN proxy servers received from the central server 306, and may filter the list of VPN proxy servers to identify VPN proxy servers that would provide an optimal connection. For example, the client device 308 may identify those proxy servers located most closely geographically. In another example, the client device 308 may identify those proxy servers whose bandwidth capabilities most match the bandwidth capabilities of the client device 308. In another example, the client device 308 may identify optimal proxy VPN servers based on a combination of these features. Other optimization factors or preferences may also be considered.

A manner in which the system and method in present disclosure operates to perform processes for testing a VPN server is described in detail in conjunction with FIG. 4, FIG. 5, FIG. 6, FIG. 7, and FIG. 8.

FIG. 4 illustrates a network environment 400 in which a system 402 for testing a VPN server 404 is operated, according to an example embodiment. For example, the system 402 may test the VPN server 404 based on a load of the VPN server 404.

In an example, while processing the traffic data through the VPN server 404, the VPN server 404 may redirect the traffic data through a secure tunnel by encrypting it. Thus, even if any unauthorized access occurs on the traffic data, the traffic data can't be used without decryption. The VPN server 404 can house a certain number of connections and, as the number of users reaches the limit, it becomes more and more difficult for it to allocate resources. Various conditions might create overload on the VPN server 404. In many cases, operations are using bandwidth excessively, and in other situation the VPN server 404 may run out of processor power. The VPN server 404 is designed to handle certain levels of traffic. When it is overloaded, it responds too slowly or not at all.

The system 402 is configured to validate or test the VPN server 404. Typically, as a user 408 of a client device 406 raises a request with the VPN server 404, the VPN server 404 may need appropriate amount of resources to process or perform the requested operations. For example, the requested operations may cause an overload at the VPN server, for example, due to multitude of VPN clients connected to the VPN server 404. To this end, whenever a user or a VPN client connects to the VPN server 404 through the system 402, the system 402 is configured to validate or test the VPN server 404. A manner in which the system 402 operates to test the VPN server 404 is described in conjunction with the following FIG. 5, FIG. 6, FIG. 7, and FIG. 8.

FIG. 5 shows a block diagram 500 of the system 402 for testing the VPN server 404, according to an example embodiment. The system 402 may include one or more processor 502, a memory 504 and an I/O interface 506.

The one or more processor 502 (referred to as processor 502, hereinafter) may be embodied in a number of different ways. The memory 504 may be a non-transitory and may include, for example, one or more volatile and/or nonvolatile memories.

In accordance with an embodiment, the system 402 may store data that may be generated by the processor 502 while performing corresponding operation or data that may be retrieved from a database associated with the system 402, such as a third party database, etc. In an example, the data may include data relating to the virtual private network server 404, computational resources, traffic data and the like.

The processor 502 is coupled to the memory 504 and the I/O interface 506. The memory 504 may have stored therein at least one of the programs or instructions executed by the processor 502 to configure the system 402 to perform the testing of the VPN server 404. The system 402 in intended to represent a computer system or network of computer systems. A "computer system," as used herein, may include or be implemented as a specific purpose computer system for carrying out the functionalities described in this paper. The processor 502 may be, for example, a general-purpose central processing unit (CPU), such as a microprocessor, or a special-purpose processor, such as a microcontroller. The processor 502 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 502 may include one or more processing cores configured to perform independently. A multi-core processor may enable multiprocessing within a single physical package. Additionally or alternatively, the processor 502 may include one or more processors configured in tandem via the bus to enable independent execution of instructions, pipelining and/or multithreading. Additionally or alternatively, the processor 502 may include one or more processors capable of processing large volumes of workloads and operations to provide support for big data analysis. In an example embodiment, the processor 502 may be in communication with the memory 504 and/or the I/O interface 506 via a bus for passing information among components of the system 402.

In an example, when the processor 502 is embodied as an executor of software instructions, the instructions may specifically configure the processor 502 to perform the algorithms and/or operations described herein when the instructions are executed. However, in some cases, the processor 502 may be a processor specific device (for example, a mobile terminal or a fixed computing device) configured to employ an embodiment of the present disclosure by further configuration of the processor 502 by instructions for performing the algorithms and/or operations described herein. The processor 502 may include, among other things, a clock, an arithmetic logic unit (ALU) and logic gates configured to support operation of the processor 502.

For example, the memory 504 may be an electronic storage device (for example, a computer readable storage medium) comprising gates configured to store data (for example, bits) that may be retrievable by a machine (for example, a computing device like the processor 502). The memory 504 may be configured to store information, data, content, applications, instructions, or the like, for enabling the system 402 to carry out various functions in accordance with an example embodiment of the present disclosure. For example, the memory 504 may be configured to buffer input data for processing by the processor 502. The memory 504 may be configured to store instructions for execution by the processor 502.

The memory 504 of the system 402 may be configured to store a dataset (such as, but not limited to, virtual private network server data, software application data, traffic data and testing data). In accordance with an embodiment, the memory 504 may include processing instructions for processing the testing data.

In operation, the processor 502 may be configured to receive a request for connecting to the VPN server 404. The request may include the request indicating a number of test operations associated with the VPN server 404 and a computation resource requirement for performing the test operations. The VPN server 404 may be accessed over the internet by the client device 406. In one embodiment, the user 408 uses a network enabled client device 406 to send the request for VPN server over the internet. The client device 406 can be a desktop or laptop computer, a smart phone, a PDA, and the like. The client device 406 may provide a CLI interface 410 to receive the input from the user 408. In this description, the term "user" and "client" can be used interchangeably to identify the person or device that is attempting to send the request for the VPN server 404. The request indicating the number of test operations associated with the VPN server 404, for example, domain name server test, internet protocol address test, speed test, malware test and the like. The request also indicating the computational resource requirement for performing the test operations. The computation resource may include, but is not limited to, data storage, servers, databases, networking, analytics, artificial intelligence, software applications and the like.

The term "command line interface (CLI)" refers to a method of interacting with a device or software by allowing a user to enter commands into a text terminal, a terminal emulator, or remote shell client. The commands are processed by the CLI which initiates operations that correspond to the entered command. In an example, the CLI displays a prompt to accept a command that is typed by a user and terminated by an enter key. For example, a command includes a command name, which designates the type of operation to be performed and a parameter, which may be data, a file, a device or an object on which the operation should be performed. One or more switches flags, or other entries may also be included to modify or control how the operation is executed. For example, a VPN policy for the VPN server may be created using the CLI. In this regard, parameters of the VPN policy may be configured using CLI to enable a VPN.

In operation, the processor 502 may further be configured to configure a master node 412 and a set of worker node 414a to worker node 414n (collectively, the worker nodes 414) based on the computation resource requirement. In order to process the test operations, the VPN server 404 may need the computational resources. To provide the required computational resources, the processor 502 may configure the master node 412 to identify the computational resources requested by the test operations.

The term "master-worker protocol" refers to a protocol having a hierarchy of a master node that may be used to coordinate actions of and assign work to pools of worker nodes. In particular, the master node generates work units and distributes them to the worker nodes. In turn, an available (or selected) worker node consumes the work unit. For example, the master node may distribute the work units depending on the workload of the worker node.

For example, large amount of computing work may be handled using parallel computing techniques that solves a problem by dividing a large problem into smaller tasks which may be executed simultaneously in a coordinated manner. In this regard, a master node may divide a problem into individual work units and distribute the work units to a collection of worker nodes. Each worker node then performs an appropriate operation on the work units assigned to that node. As a large number of worker nodes are performing different work units of same problem, extremely large datasets may be processed in a relatively short period of time.

Based on the identified computational resources requested by the test operations, the processor 502 may further configure the master node 412 to identify the computational resources that are available on the worker nodes 414 to process the test operations. Further, the processor 502 may configure the worker nodes 414 to provide the available computational resources it has. For example, the available computational resources on worker node 414a may have a CPU and the worker node 414n may have a memory. Continuing with present example, the master node 412 may identify the requested computational resources as a CPU and a memory to process the test operations. In order to process the requested test operation, the master node 412 may use the CPU and the memory. According to the available computational resources on the worker nodes 414, the master node 412 may assign the test operations to the worker nodes 414.

In operation, the processor 1002 may further be configured to cause the set of worker nodes 414a to 414n (collectively, the worker nodes 414) to perform the test operations to generate the traffic data. The worker nodes 414 may use the available computational resources to perform the test operations to generate the traffic data. The worker nodes 414 perform the data processing operations for performing the test operations. The data processing operations may include, but is not limited to, read and write the data relating to the test operations and store the computational results in memory. While performing these data processing operations, the worker nodes 414 may generate the traffic data on the VPN server 404. For example, the worker nodes 414 may process the data relating to the test operations and generate the resultant data by determining the data relating to the test operations. This resultant data may further be stored into the memory. In one example, this resultant may form the traffic on the VPN server 404 as traffic data. In this way, the worker nodes 414 may generate the traffic data on the VPN server 404.

In operation, the processor 502 may further be configured to validate a load on the VPN server 404 based on the generated traffic data and resources of the VPN server 404. The traffic data generated on the VPN server 404 may affect the efficiency of the VPN server 404. In some cases, the VPN server 404 may not be responsive due to larger workloads generated by the traffic data on the VPN server 404. The processor 502 may be configured to validate the load on the VPN server 404.

In one embodiment of the present disclosure, the system 402 may validate or test the VPN server 404 based on the time taken by the VPN sever 404 to process the data relating to the test operations. In one example, the time taken may identified by determining the time that the VPN server 404 takes between an initial phase of processing the test operations and its completion.

In another embodiment of the present disclosure, the system 402 may validate or test the VPN server 404 based on the available computational resources on the worker node 414.

Further, if the system 402 may find that the VPN server 404 is capable of processing the test operations, the VPN server 404 may further transfer the generated traffic data to the virtual private cloud 416.

FIG. 6 illustrates an example flowchart of a method 600 for testing the VPN server 404, according to an example embodiment of the present disclosure.

In this regard, at 602, the system 402 may be configured to receive a request from the user 408 for the VPN server 404. For example, the user 408 may connected to the virtual private cloud 416 via a cloud exchange point (CXP). The cloud exchange point may transfer the user data to the virtual private cloud 416 over the public network. In some case, the user 408 may need the user data to be transferred in encrypted form. To achieve this, the user may request the system 402 for the VPN server 404. The VPN server 404 may transfer the user data in encrypted form. The user 408 may use the CLI Interface 410 enabled client device 406 to request the system 402 for the VPN server 404. This request may indicate the test operations and the computational resources required to perform the test operations.

At 604, the system 402 may be configured to configure the master node 412 and the set of worker nodes 414 based on the computational resource requirement. In order to perform the test operations, the system 402 may need the computational resources. For example, to perform the internet protocol address test operation on the VPN server 404, the system 404 may need computational resources like a CPU to obtain the IP address of the client device, a memory to store the test instruction and the CPU to perform the test instructions. In order to use these computational resources, the system 402 may configure the master node 412 to identify if the CPU and the memory are available on the worker nodes 414. Further, the system 402 may assign the test operations to the worker nodes 414, based on the availability of the computational resources like the CPU and the memory.

At 606, the system 402 may be configured to cause the worker nodes 414 to perform the test operations to generate the traffic data. The worker nodes 414 may perform the test operations assigned by the master node 412. For example, the test operation may require a certain bandwidth to perform the test operation. Continuing with the present example, the worker nodes 414 may use the bandwidth to process the data relating to the test operations. This processing may generate traffic as traffic data on the VPN server 404.

At 608, the system 402 may be configured to validate a load on the VPN server 404. The generated traffic on the VPN server 404 may produce the load on the VPN server 404. VPN server load may also increase latency, and connecting to the VPN server 404 introduces a new opportunity for users to experience server load issues. For example, the user 408 is connecting to the VPN server 404 at a same time as 1,000 other users, and the VPN server 404 only has enough capacity to handle 300 requests at a time. In such a case, the VPN server 404 will likely get overloaded and start queuing or dropping requests, slowing load times for the user 408 and many of the VPN's other users. The capacity of the VPN server 404 to handle the user requests may depend on the availability of the computational resources (such as, CPU, memory, virtual machines, etc.). The system 402 may validate or test the load on the VPN server 404 based on the availability of the available computational resources on the worker nodes 414 and the time taken by the VPN server 404 to perform the test operation.

At 610, the system 402 may be configured to identify the time taken by the VPN server 404 to perform the test operations. In one example, the time taken may be determined as a number of seconds taken by the VPN server 404 between a start of processing the test operations to an end of the test operations. The time taken may depend on the availability of the computational resources available on the worker nodes 414 of the VPN server 404.

At 612, the system 402 may be configured to check if the time taken is greater than or less than a threshold.

On determining the time taken to be greater than the threshold, at 614, the system 402 may be configured to reconfigure the VPN server 404 to build the VPN server capable of performing the test operation. In one example, to reconfigure the VPN server 404, the system 402 may add more worker nodes to increase the efficiency of the VPN server 404 to process the data relating to the test operations. The increased worker nodes 414 may provide more computational resources. This increased number of computational resources may increase the efficiency of the VPN server 404. In another example, the system 402 may reconfigure the VPN server 404 by changing the master node 412 with one of the worker nodes 414. This may lead the VPN server 404 to have a more efficient master node.

Alternatively, on determining the time taken to be less than the threshold, at 616, the present configuration of the VPN server 404 may be continually used to perform the test operations. For example, the present configuration of the VPN server 404 may continue to perform the test operation assigned by the user 408 until the new may request for the VPN server 404 to perform the new test operations.

In this manner, based on the comparison between the time taken and the threshold, the VPN server 404 is validated. Based on real-time validation of the VPN server 404, reconfiguration of the VPN server 404 may be implemented. This may ensure the capability of the VPN server 404 to perform the test operations is appropriate and prevent any cause of denial of service by the VPN server 404 for the user 408.

FIG. 7 illustrates an example flowchart of a method 700 for performing a comparison between the threshold and the time taken, according to an embodiment of the present disclosure.

At 702, the system 402 may be configured to cause the VPN server 404 to receive and process the traffic data. When the VPN server 404 may start performing the test operations, the VPN server 404 may use multiple worker nodes 414. These worker nodes 414 may use resources (such as CPU, RAM, etc.) to perform the test operations. The worker nodes 414 may be used for both data computation relating to the test operations and storing the resultant data. For example, the master node 412 may assign the test operation to the worker nodes 414. These worker nodes 414 may perform the test operations in chunks of sub operations and generate the results. Further the master node 412 may collect these results from the worker nodes 414 and combine them to form a final resultant data. This computation and storing of resultant data may lead the traffic on the VPN server 404 as the traffic data.

At 704, the system 402 may be configured to identify the time taken by the VPN server 404 to perform the test operations. For example, the VPN server 404 may need the computational resource, such as CPU with high bandwidth to perform the test operations. However, the worker nodes 414 may have the computational resources with less bandwidth. This may lead to delay or termination of the test operations. This can be prevented by identifying the time taken by the VPN server 404 to perform the test operations. In one example, the system 402 may determine the time taken by identifying required computational resources for performing the test operations and available computational resources.

At 706, the system 402 may be configured to perform the comparison between the threshold and the time taken. The system 402 may configure the processor 502 to perform the comparison between the time taken and the threshold. Moreover, a test report may be generated based on the comparison between the time taken and the threshold. The test report may be utilized to reconfigure the VPN server 404 for changing a capacity or capability of the VPN server 404 to perform the test operations. In certain cases, the test report may be utilized to identify critical bugs or error in the VPN server 404 configurations.

FIG. 8 illustrates an example flowchart of a method 800 for testing a virtual private network server 404, according to an embodiment of the present disclosure.

At 802, the system 402 may be configured to cause the VPN server 404 to receive and process test operations. For example, the master node 412 may assign the test operations to the worker nodes 414 and in order to perform the test operations, the worker nodes 414 may generate traffic data on the VPN server 404.

At 804, the system 402 may be configured to identify time taken by the VPN server 404 to perform the test operations. The system 402 may identify the time taken by the VPN server 404 by identifying required computational resources for performing the test operations and the available computational resources on the worker nodes 414. For example, due to large traffic data on the VPN server 404, the worker nodes 414 may not provide the required computational resources to process the traffic data associated with the test operations. This may cause the VPN server 404 to be no longer responsive and increase the time taken for performing the test operations.

At 806, the system 402 may be configured to perform a comparison between the threshold and the time taken by the VPN server 404 to perform the test operations. The threshold may indicate a maximum or an appropriate time that the VPN server 404 may take to perform the test operation. For example, due to large workload and unavailability of the required computational resources, the VPN server 404 may take more time than the threshold value. The system 402 may determine this by identifying the workload and the available resources.

At 808, the system 402 may be configured to cause the VPN server 404 to receive and process the traffic data based on the comparison. For example, on determining that the time taken is greater than the threshold, the system 402 may increase a number of the worker nodes 414 on the VPN server 404. However, if the time taken less than the threshold, the VPN server 404 may continue to process the traffic data.

Accordingly, blocks of the methods 600, 700 and 800 support combinations of means for performing the specified functions and combinations of operations for performing the specified functions for performing the specified functions. It will also be understood that one or more blocks of the methods 600, 700 and 800, and combinations of blocks in the methods 600, 700 and 800, can be implemented by special purpose hardware-based computer systems which perform the specified functions, or combinations of special purpose hardware and computer instructions.

Alternatively, the system 908 may comprise means for performing each of the operations described above. In this regard, according to an example embodiment, examples of means for performing operations may comprise, for example, the processor 1002 and/or a device or circuit for executing instructions or executing an algorithm for processing information as described above.

On implementing the methods 600, 700 and 800 disclosed herein, the efficiency and availability of the VPN server is validated, wherein such validated VPN server may be used to improve connection to VPN from multiple clients.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A system for testing a virtual private network server, comprising:

a processor;

a memory coupled to the processor, the memory having stored therein at least one of programs or instructions executable by the processor to configure the system to:

receive a request for a VPN server, the request indicating a number of test operations associated with the VPN server and a computation resource requirement for performing the test operations, wherein each of the test operation comprises VPN-specific load testing operations;

configure a master node and a set of worker nodes based on the computation resource requirement; and cause the set of worker nodes to perform the test operations to generate traffic data, wherein the traffic data comprises VPN tunnel traffic; and validate a load of the VPN server based on the generated traffic data and resources of the VPN server, wherein validating the load of the VPN server comprises determining whether the VPN server is able to process additional client connections.

2. The system of claim 1, wherein the VPN server is configured to:

receive the traffic data; and process the traffic data to generate routing messages corresponding to the traffic data.

3. The system of claim 1, wherein the VPN server is configured within a cloud exchange point.

4. The system of claim 1, wherein, to validate the load of the VPN server, the processor is further configured to:

identify a time taken by the VPN server to process the traffic data; and on determining the time to be greater than a threshold, cause to identify that said VPN server is unable to process the load of the traffic data.

5. A non-transitory computer readable storage medium, having stored thereon, a set of computer-executable instructions that causes a computer to perform a method for testing a virtual private network server, the method comprising:

receiving a request for a VPN server, the request indicating a number of test operations associated with the VPN server and a computation resource requirement for performing the test operations, wherein each of the test operation comprises VPN-specific load testing operations;

configuring a master node and a set of worker nodes based on the computation resource requirement; and causing the set of worker nodes to perform the test operations to generate traffic data, wherein the traffic data comprises VPN tunnel traffic; and validating a load of the VPN server based on the generated traffic data and resources of the VPN server, wherein validating the load of the VPN server comprises determining whether the VPN server is able to process additional client connections.

6. The non-transitory computer readable storage medium of claim 5, wherein the VPN server is configured to:

receive the traffic data; and process the traffic data to generate routing messages corresponding to the traffic data.

7. The non-transitory computer readable storage medium of claim 5, wherein the VPN server is configured within a cloud exchange point.

8. The non-transitory computer readable storage medium of claim 5, wherein validating the load of the VPN server further comprises:

identifying a time taken by the VPN server to process the traffic data; and on determining the time to be greater than a threshold, causing to identify that said VPN server is unable to process the load of the traffic data.

9. A method, comprising:

receiving a request for a VPN server, the request indicating a number of test operations associated with the VPN server and a computation resource requirement for performing the test operations, wherein each of the test operation comprises VPN-specific load testing operations;

configuring a master node and a set of worker nodes based on the computation resource requirement; and causing the set of worker nodes to perform the test operations to generate traffic data, wherein the traffic data comprises VPN tunnel traffic; and validating a load of the VPN server based on the generated traffic data and resources of the VPN server, wherein validating the load of the VPN server comprises determining whether the VPN server is able to process additional client connections.

10. The method of claim 9, wherein the VPN server is configured to:

receive the traffic data; and process the traffic data to generate routing messages corresponding to the traffic data.

11. The method of claim 9, wherein the VPN server is configured within a cloud exchange point.

12. The method of claim 9, wherein validating the load of the VPN server further comprises:

identifying a time taken by the VPN server to process the traffic data; and on determining the time to be greater than a threshold, causing to identify that said VPN server is unable to process the load of the traffic data.

* * * * *